US012644395B2

(12) United States Patent
Yokoi et al.

(10) Patent No.: US 12,644,395 B2
(45) Date of Patent: Jun. 2, 2026

(54) DEFORMATION ADJUSTMENT METHOD FOR LOWER HALF INNER CASING

(71) Applicant: MITSUBISHI HEAVY INDUSTRIES, LTD., Tokyo (JP)

(72) Inventors: Noriyuki Yokoi, Tokyo (JP); Eiichi Tsutsumi, Tokyo (JP); Takuya Komatsubara, Tokyo (JP); Naoki Goya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 19/108,570

(22) PCT Filed: Sep. 25, 2023

(86) PCT No.: PCT/JP2023/034705

§ 371 (c)(1),
(2) Date: Mar. 4, 2025

(87) PCT Pub. No.: WO2024/075568

PCT Pub. Date: Apr. 11, 2024

(65) Prior Publication Data

US 2026/0085622 A1 Mar. 26, 2026

(30) Foreign Application Priority Data

Oct. 4, 2022 (JP) ................................ 2022-159915

(51) Int. Cl.
*F01D 25/24* (2006.01)

(52) U.S. Cl.
CPC ........ *F01D 25/243* (2013.01); *F05D 2260/31* (2013.01)

(58) Field of Classification Search
CPC ........................... F01D 25/243; F05D 2260/31
See application file for complete search history.

(56) References Cited

U.S. PATENT DOCUMENTS 1,957,699 A * 5/1934 Dahistrand ........... F01D 25/243 220/693
8,690,533 B2 * 4/2014 Burdgick ................ F01D 9/047 415/213.1

(Continued)

FOREIGN PATENT DOCUMENTS

JP 2012013046 A * 1/2012
WO 2020/036120 2/2020

OTHER PUBLICATIONS

International Search Report issued Oct. 31, 2023 in International Application No. PCT/JP2023/034705, with English translation.

(Continued)

*Primary Examiner* — Nathaniel E Wiehe
*Assistant Examiner* — Theodore C Ribadeneyra
(74) *Attorney, Agent, or Firm* — Wenderoth, Lind & Ponack, L.L.P.

(57) ABSTRACT

A lower half inner casing has a lower half inner casing body forming a semi-circular arc, and an inner casing accessory part provided to the lower half inner casing body. The inner casing accessory part has a protrusion which protrudes radially outward of the lower half inner casing body, and protrudes upward of a lower contact surface of the lower half inner casing body. In the deformation adjustment method, the following are executed: a preparation step for preparing a deformation adjustment device having an inner casing-side member that is attachable to the protrusion so as to be non-relatively movable in the radial direction; a device arrangement step for attaching the inner casing-side member to the protrusion and arranging the deformation adjustment device around the protrusion; and a deformation adjustment step for pressing, to the radial inward side, the inner casing-side member attached to the protrusion.

7 Claims, 10 Drawing Sheets

(56) References Cited

U.S. PATENT DOCUMENTS

| | | | | |
|---|---|---|---|---|
| 10,132,179 | B2 * | 11/2018 | LeBlanc | F01D 25/285 |
| 10,174,676 | B2 * | 1/2019 | Hashimoto | F01D 25/26 |
| 2013/0230392 | A1 * | 9/2013 | Hashimoto | F01D 25/243<br>29/700 |
| 2021/0131309 | A1 | 5/2021 | Tsuchiya | |

OTHER PUBLICATIONS

Written Opinion of the International Searching Authority issued Oct. 31, 2023 in International Application No. PCT/JP2023/034705, with English translation.

* cited by examiner

DEFORMATION ADJUSTMENT METHOD FOR LOWER HALF INNER CASING

TECHNICAL FIELD

The present invention relates to a deformation adjustment method for a lower half inner casing in a rotary machine.

Priority is claimed on Japanese Patent Application No. 2022-159915 filed on Oct. 4, 2022, the content of which is incorporated herein by reference.

BACKGROUND ART

A rotary machine such as a steam turbine and a gas turbine generally includes a rotor that is rotatable around an axis extending in a horizontal direction, an inner casing that covers an outer periphery of the rotor, and an outer casing that covers an outer periphery of the inner casing. The inner casing includes a lower half inner casing that has a semi-circular arc shape around the axis and that covers a portion of the rotor that is closer to a lower side than the axis is and an upper half inner casing that has a semi circular arc shape around the axis and that covers a portion of the rotor that is closer to an upper side than the axis is. The outer casing includes a lower half outer casing that has a semi-circular arc shape around the axis and that covers an outer peripheral side of the lower half inner casing and an upper half outer casing that has a semi-circular arc shape around the axis and that covers an outer peripheral side of the upper half inner casing.

In the rotary machine as described above, the inner casing may be deformed over time due to the weight thereof, thermal effects, and the like. In a case where the inner casing is deformed, it may be difficult to disassemble the rotary machine or the like. Therefore, in description of PTL 1 below, a technique of adjusting deformation of an inner casing by using a deformation adjustment device is disclosed.

The deformation adjustment device includes an inner casing-side member that is attached to a lower half inner casing which is a lower half vane ring, an outer casing-side member that is attached to a lower half outer casing disposed on an outer peripheral side of the lower half inner casing, and a rod for adjustment of a distance between the inner casing-side member and the outer casing-side member. The lower half inner casing includes a lower contact surface that extends in horizontal directions and is able to come into contact with an upper half inner casing, and a bolt hole that is recessed from the lower contact surface in a vertical direction. The lower half outer casing includes a lower contact surface that extends in horizontal directions and is able to come into contact with an upper half outer casing, and a bolt hole that is recessed from the lower contact surface in the vertical direction. The inner casing-side member is attached to a fastening bolt that is partially inserted into the bolt hole of the lower half inner casing and that protrudes upward from the lower contact surface of the lower half inner casing. In addition, the outer casing-side member is attached to a fastening bolt that is partially inserted into the bolt hole of the lower half outer casing and that protrudes upward from the lower contact surface of the lower half outer casing. A male screw is formed at a tip of the rod. In addition, a female screw, into which the male screw of the rod can be screwed, is formed at the outer casing-side member. In this technique, the distance between the inner casing-side member and the outer casing-side member is adjusted and deformation of the lower half inner casing to which the inner casing-side member is attached is adjusted in a case where a degree to which the rod is screwed into the outer casing-side member is adjusted.

CITATION LIST

Patent Literature

[PTL 1] International Publication No. WO 2020/036120

SUMMARY OF INVENTION

Technical Problem

In the case of the technique described in PTL 1 described above, since the inner casing-side member of the deformation adjustment device is attached to the fastening bolt that protrudes from the lower contact surface of the lower half inner casing, the inner casing-side member of the deformation adjustment device is present on the lower contact surface of the lower half inner casing at a time when deformation of the lower half inner casing is adjusted by means of the deformation adjustment device. Therefore, in the case of the technique described in PTL 1 described above, there is a problem that it is extremely troublesome to connect the upper half inner casing to the lower half inner casing in a state where the deformation of the lower half inner casing is being adjusted.

Therefore, an object of the present disclosure is to provide a deformation adjustment method for a lower half inner casing with which it is possible to easily connect an upper half inner casing to the lower half inner casing even in a state where deformation of the lower half inner casing is being adjusted.

Solution to Problem

A deformation adjustment method for a lower half inner casing according to one aspect of the invention that is for achievement of the above-described object is applied to a rotary machine as follows.

A deformation adjustment method for a lower half inner casing in a rotary machine that includes a rotor rotatable around an axis extending in a horizontal direction, an inner casing covering an outer periphery of the rotor, and an outer casing covering an outer periphery of the inner casing. The inner casing includes the lower half inner casing that has a semi-circular arc shape around the axis and that covers a portion of the rotor that is closer to a lower side than the axis is and an upper half inner casing that has a semi-circular arc shape around the axis and that covers a portion of the rotor that is closer to an upper side than the axis is. The outer casing includes a lower half outer casing that has a semi-circular arc shape around the axis and that covers an outer peripheral side of the lower half inner casing and an upper half outer casing that has a semi-circular arc shape around the axis and that covers an outer peripheral side of the upper half inner casing. The lower half inner casing includes a lower half inner casing body that has a semi-circular arc shape around the axis and that covers a portion of the rotor that is closer to the lower side than the axis is and an inner casing accessory part that is provided at the lower half inner casing body. The lower half inner casing body includes lower contact surfaces that extend in horizontal directions at both ends in a circumferential direction with respect to the axis and that are able to come into contact with the upper half inner casing. The inner casing accessory part includes a protrusion portion that protrudes to be closer to a radial outer side with respect to the axis than the lower half inner casing body is and that protrudes to be closer to the upper side than the lower contact surfaces are.

The deformation adjustment method for a lower half inner casing in the above-described rotary machine includes a preparation step of preparing a deformation adjustment device including an inner casing-side member that is attachable to the protrusion portion to be immovable in a radial direction with respect to the axis relative to the protrusion portion, a device alignment step of attaching the inner casing-side member to the protrusion portion and disposing the deformation adjustment device including the inner casing-side member around the protrusion portion, and a deformation adjustment step of pressing the inner casing-side member attached to the protrusion portion toward a radial inner side with respect to the axis or pulling the inner casing-side member toward the radial outer side.

In the present aspect, since deformation of the lower half inner casing can be adjusted, a problem such as contact between the lower half inner casing and the rotor that occurs at the time of disassembly or assembly of the rotary machine can be avoided. Furthermore, in the present aspect, since the deformation adjustment device is not present on the lower contact surfaces of the lower half inner casing when deformation of the lower half inner casing is adjusted with the deformation adjustment device, the upper half inner casing can be easily connected to the lower half inner casing during deformation adjustment.

Advantageous Effects of Invention

According to the aspect of the present disclosure, it is possible to easily connect an upper half inner casing to a lower half inner casing even in a state where deformation or the position of the lower half inner casing is being adjusted.

DESCRIPTION OF EMBODIMENTS

Hereinafter, various embodiments of the present invention and modification examples thereof will be described in detail with reference to the drawings. Before description about an embodiment of "a deformation adjustment method for a lower half inner casing", an embodiment of a rotary machine to which the method is applied will be described.

Embodiment of Rotary Machine

The embodiment of the rotary machine will be described with reference to FIGS. 1 to 4.

Figure 1:
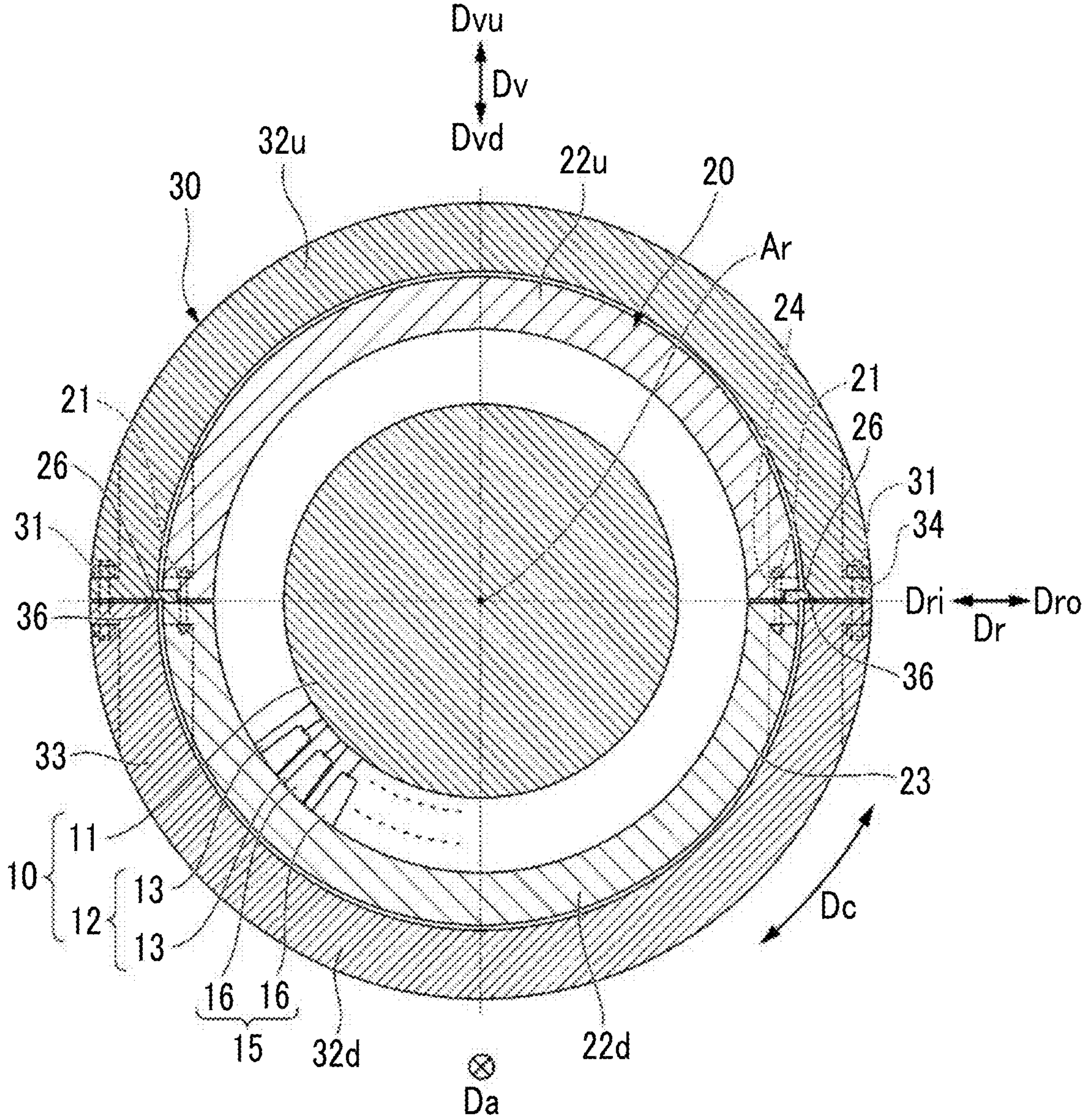
FIG. 1 is a schematic cross-sectional view of a rotary machine according to an embodiment of the present disclosure.

The rotary machine in the present embodiment is, for example, a gas turbine. As shown in FIG. 1, the rotary machine includes a rotor 10 that is rotatable around an axis Ar extending in a horizontal direction, a plurality of stator vane rows 15, an inner casing 20 that covers an outer periphery of the rotor 10, and an outer casing 30 that covers an outer periphery of the inner casing 20. Here, a direction in which the axis Ar extends will be referred to as an axial direction Da, a direction perpendicular to the axis Ar will be referred to as a radial direction Dr, and a circumferential direction with respect to the axis Ar will be simply referred to as a circumferential direction De. In addition, a side close to the axis Ar in the radial direction Dr will be referred to as a radial inner side Dri and the opposite side will be referred to as a radial outer side Dro. Furthermore, a direction that is the radial direction Dr and that is the vertical direction will be referred to as a vertical direction Dv.

The rotor 10 includes a rotor shaft 11 that is centered on the axis Ar and that extends in the axial direction Da and a plurality of rotor blade rows 12 attached to the rotor shaft 11. The plurality of rotor blade rows 12 are arranged in the axial direction Da. Each of the rotor blade rows 12 includes a plurality of rotor blades 13 arranged in the circumferential direction De.

The plurality of stator vane rows 15 are arranged in the axial direction Da and are attached to an inner peripheral side of the inner casing 20. Therefore, the inner casing 20 may be referred to as a vane ring. Each of the stator vane rows 15 includes a plurality of stator vanes 16 arranged in the circumferential direction De.

The inner casing 20 includes an upper half inner casing 22*u*, a lower half inner casing 22*d*, and a plurality of inner casing fastening bolts 21 that fasten the upper half inner casing 22*u* and the lower half inner casing 22*d* to each other.

The upper half inner casing 22*u* has a semi-circular arc shape around the axis Ar and covers a portion of the rotor 10 that is closer to an upper side Dvu than the axis Ar is. The lower half inner casing 22*d* has a semi-circular arc shape around the axis Ar and covers a portion of the rotor 10 that is closer to a lower side Dvd than the axis Ar is.

The outer casing 30 includes an upper half outer casing 32*u*, a lower half outer casing 32*d*, and a plurality of outer casing fastening bolts 31 that fasten the upper half outer casing 32*u* and the lower half outer casing 32*d* to each other. The upper half outer casing 32*u* has a semi-circular arc shape around the axis Ar and covers an outer peripheral side of the upper half inner casing 22*u*. The lower half outer casing 32*d* has a semi-circular arc shape around the axis Ar and covers an outer peripheral side of the lower half inner casing 22*d*.

Figure 2:
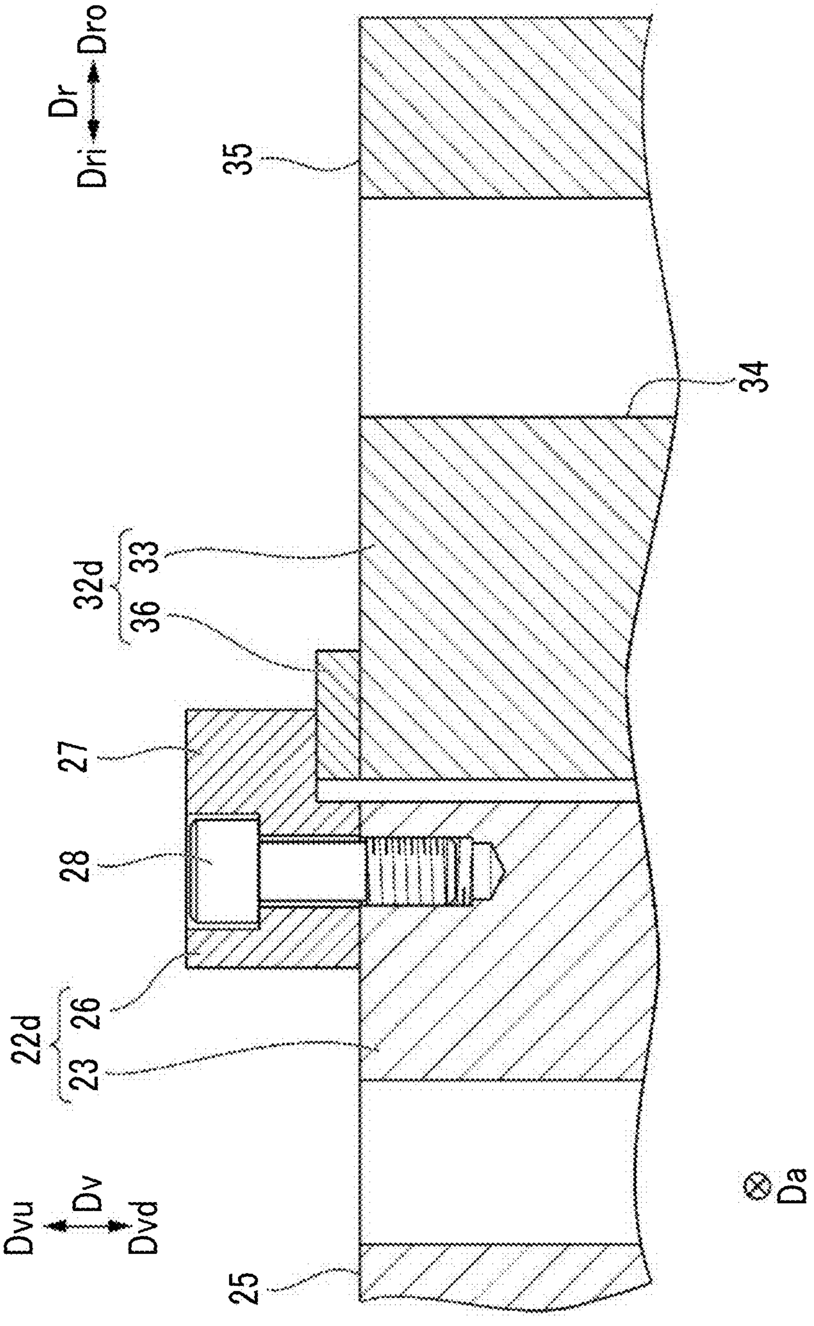
FIG. 2 is a cross-sectional view of a main part of the rotary machine according to the embodiment of the present disclosure.

As shown in FIGS. 1 and 2, the lower half inner casing 22*d* includes a lower half inner casing body 23 and a plurality of inner casing accessory parts 26. The lower half inner casing body 23 has a semi-circular arc shape around the axis Ar and covers a portion of the rotor 10 that is closer to the lower side Dvd than the axis Ar is. The plurality of inner casing accessory parts 26 are provided at the lower half inner casing body 23. The lower half inner casing body 23 includes lower contact surfaces 25 and a plurality of bolt holes 24. The lower contact surfaces 25 are surfaces that extend in horizontal directions at both ends of the lower half inner casing body 23 in the circumferential direction De, that face the upper side Dvu, and that come into contact with the upper half inner casing 22*u*. The plurality of bolt holes 24 are holes that are recessed from the lower contact surfaces 25 and that penetrate the lower half inner casing body 23 in the vertical direction Dv. The plurality of bolt holes 24 are arranged in the axial direction Da. The inner casing fastening bolts 21 are inserted into the plurality of bolt holes 24. The lower half inner casing 22*d* and the upper half inner casing 22*u* are fastened to each other by the inner casing fastening bolts 21. Each of the plurality of inner casing accessory parts 26 includes a protrusion portion 27 that protrudes toward the radial outer side Dro from the lower half inner casing body 23 and that protrudes to be closer to the upper side Dvu than the lower contact surfaces 25 are. The plurality of inner casing accessory parts 26 are arranged in the axial direction Da. Each of the plurality of inner casing accessory parts 26 is fixed to the lower half inner casing body 23 by a screw 28. The inner casing accessory parts 26 may be referred to as keys.

The lower half outer casing 32*d* includes a lower half outer casing body 33 and a plurality of outer casing accessory parts 36. The lower half outer casing body 33 has a semi-circular arc shape around the axis Ar and covers the outer peripheral side of the lower half inner casing 22*d*. The plurality of outer casing accessory parts 36 are provided at the lower half outer casing body 33. The lower half outer casing body 33 includes lower contact surfaces 35 and a plurality of bolt holes 34. The lower contact surfaces 35 are surfaces that extend in horizontal directions at both ends of the lower half outer casing body 33 in the circumferential direction De, that face the upper side Dvu, and that come into contact with the upper half outer casing 32*u*. The plurality of bolt holes 34 are holes that are recessed from the lower contact surfaces 35 and that penetrate the lower half outer casing body 33 in the vertical direction Dv. The plurality of bolt holes 34 are arranged in the axial direction Da. The outer casing fastening bolts 31 are inserted into the plurality of bolt holes 34. The lower half outer casing 32*d* and the upper half outer casing 32*u* are fastened to each other by the outer casing fastening bolts 31. The plurality of outer casing accessory parts 36 are arranged in the axial direction Da. Each of the plurality of outer casing accessory parts 36 is fixed, by a screw, to a portion of the lower contact surface 35 of the lower half outer casing body 33 that is on the radial inner side Dri. The outer casing accessory parts 36 may be referred to as liners.

The outer casing accessory parts 36 are positioned between the protrusion portions 27 of the inner casing accessory parts 26 and the lower contact surfaces 35 of the lower half outer casing body 33 and are sandwiched between the protrusion portions 27 of the inner casing accessory parts 26 and the lower half outer casing body 33. Therefore, it is possible to adjust the position of the lower half inner casing 22*d* in the vertical direction Dv with respect to the lower half outer casing 32*d* by adjusting the thickness of the outer casing accessory parts 36 in the vertical direction Dv. Accordingly, the inner casing accessory parts 26 and the outer casing accessory parts 36 have a role of adjusting the position of the lower half inner casing 22*d* in the vertical direction Dv with respect to the lower half outer casing 32*d*.

Figure 3:
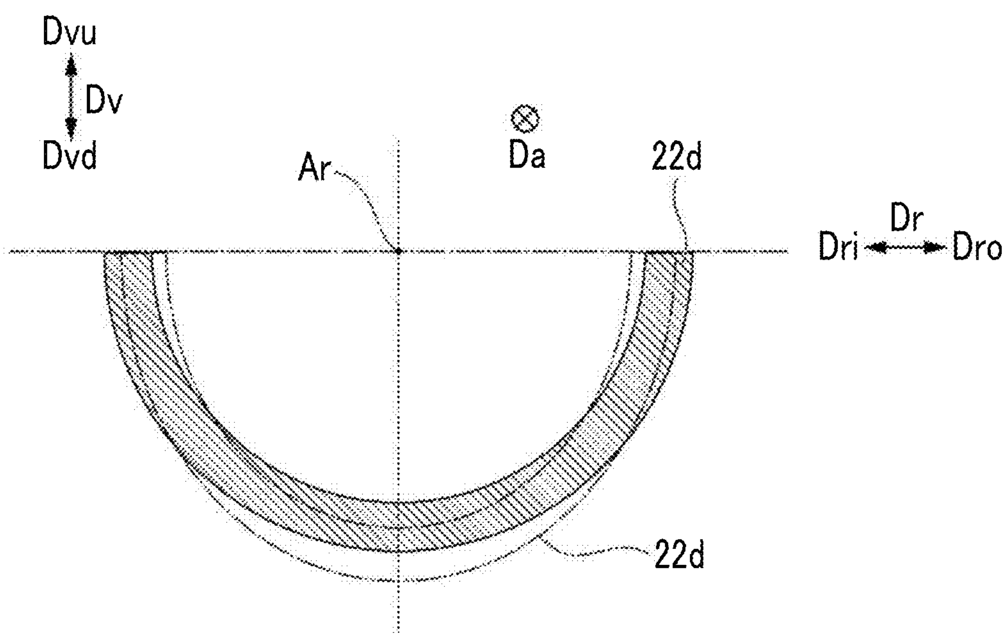
FIG. 3 is an explanatory view showing a first modification embodiment of a lower half inner casing in the embodiment according to the present disclosure.
Figure 4:
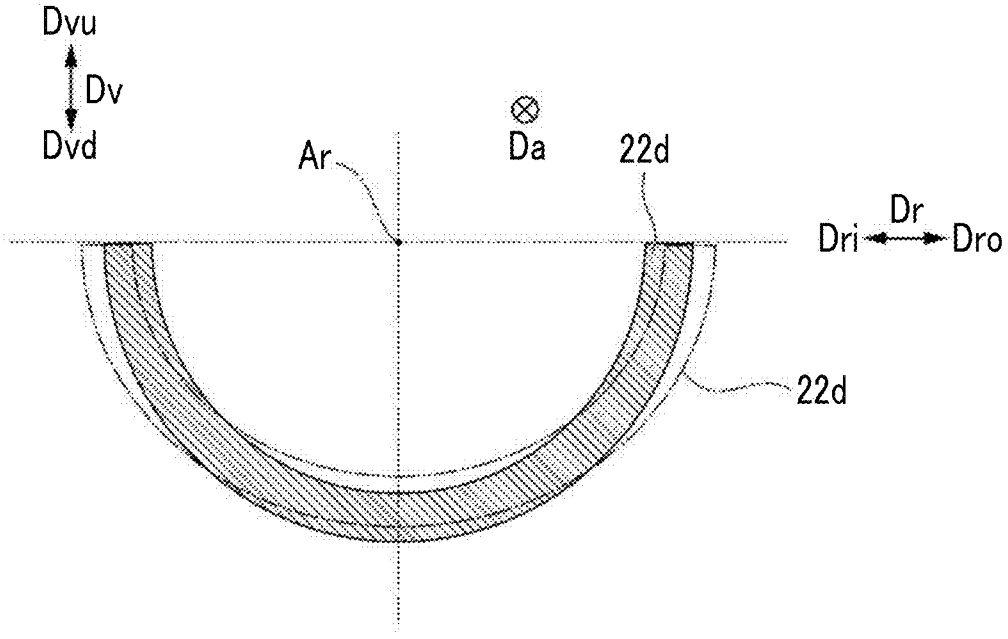
FIG. 4 is an explanatory view showing a second modification embodiment of the lower half inner casing in the embodiment according to the present disclosure.

The lower half inner casing 22*d* is deformed over time due to the weight thereof, thermal effects, and the like. In this case, for example, there are a case where a dimension in the vertical direction Dv of the lower half inner casing 22*d* (represented by imaginary lines in FIG. 3) after the deformation is large and a dimension in a horizontal direction of the lower half inner casing 22*d* is small as shown in FIG. 3 and a case where a dimension in a lateral direction of the lower half inner casing 22*d* (represented by imaginary lines in FIG. 4) after the deformation is large and a dimension in the vertical direction Dv of the lower half inner casing 22*d* is small as shown in FIG. 4. In a case where the lower half inner casing 22*d* is deformed in such a manner, a problem such as contact between the lower half inner casing 22*d* and the rotor 10 occurs at the time of disassembly or assembly of the rotary machine.

Therefore, a method of adjusting deformation of the lower half inner casing 22*d* has been studied.

First Embodiment of Deformation Adjustment Method for Lower Half Inner Casing A first embodiment of a deformation adjustment method for the lower half inner casing will be described with reference to FIGS. 5 to 9.

Figure 5:
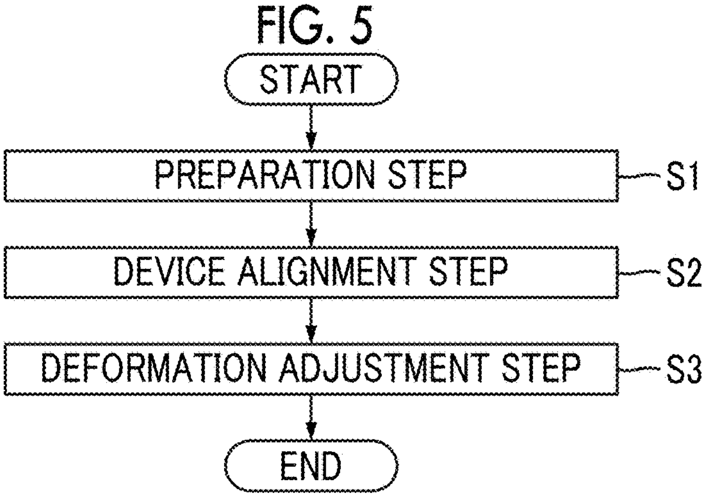
FIG. 5 is a flowchart showing a deformation adjustment method for a lower half inner casing in a first embodiment of the present disclosure.

Next, the deformation adjustment method for the lower half inner casing in the present embodiment will be described with reference to a flowchart shown in FIG. 5.

Figure 6:
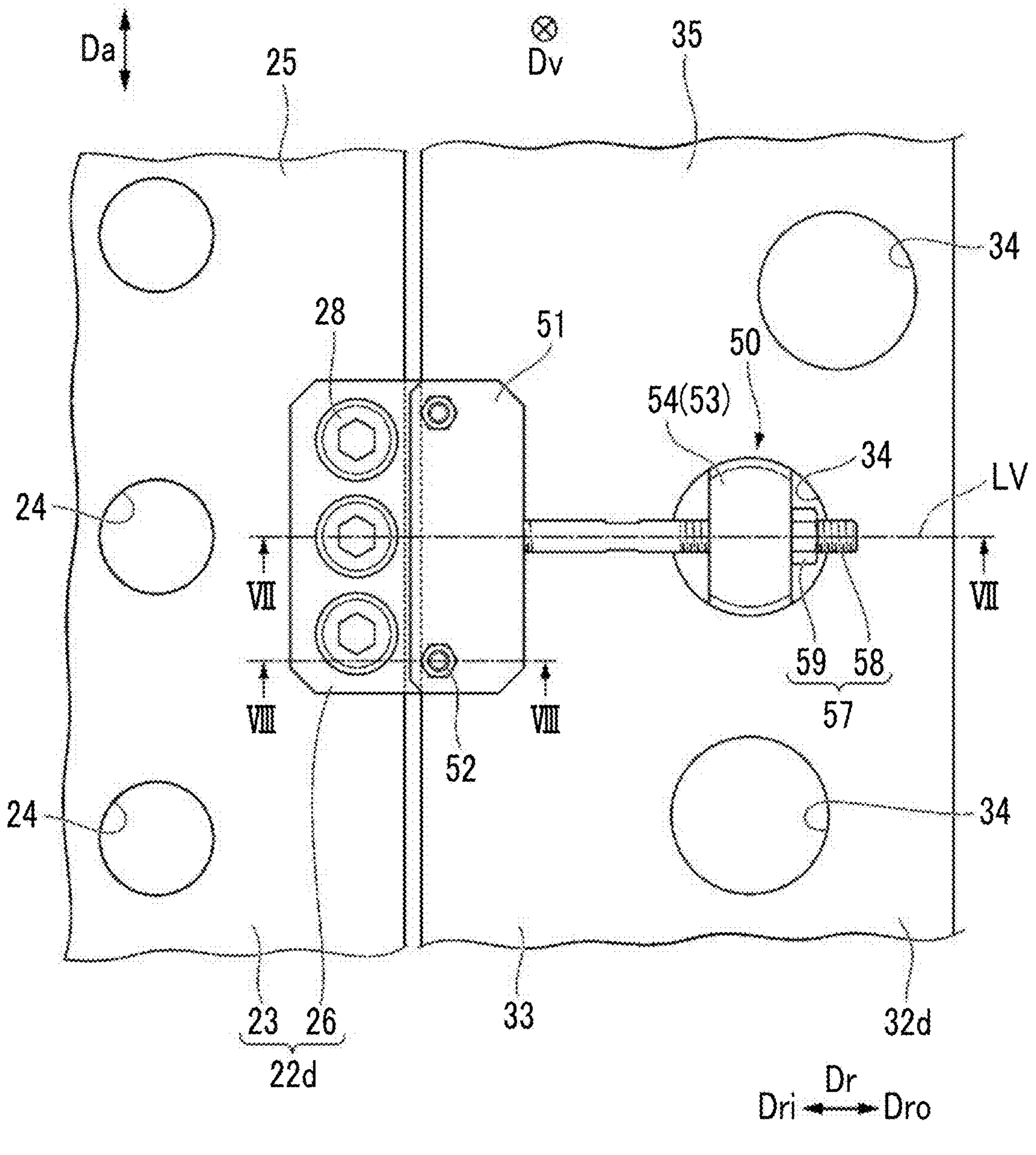
FIG. 6 is a plan view showing a way in which a deformation adjustment device is disposed when deformation causes an increase in dimension of the lower half inner casing in a lateral direction in the first embodiment of the present disclosure.
Figure 7:
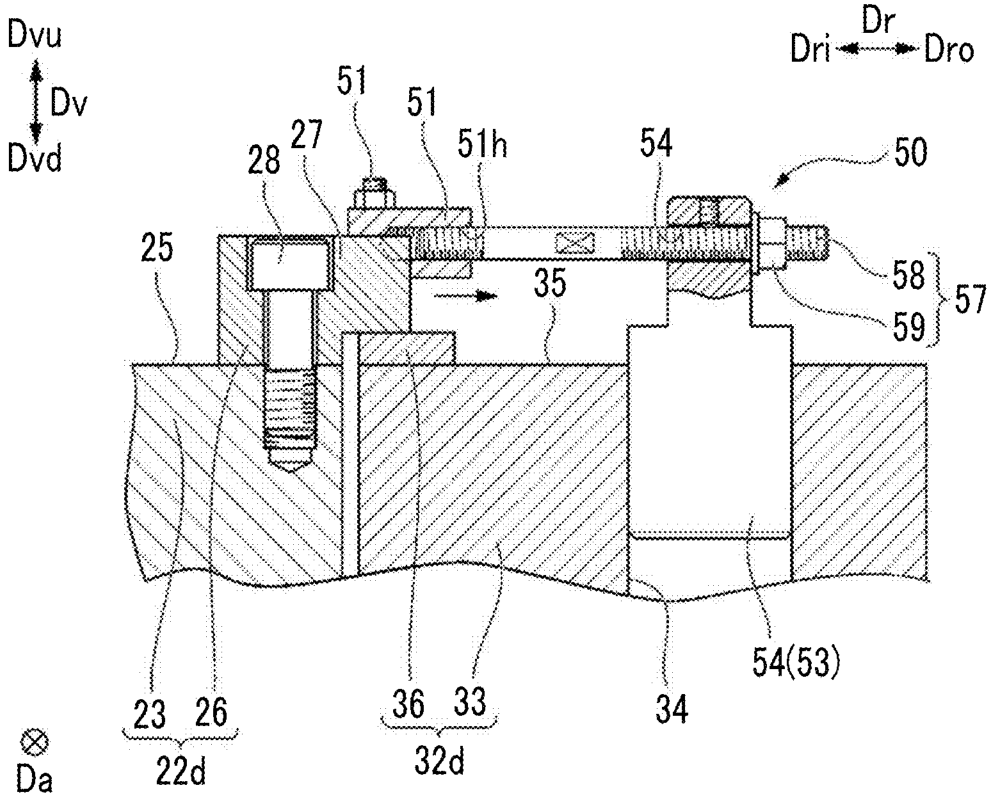
FIG. 7 is a cross-sectional view taken along line VII-VII in FIG. 6.
Figure 8:
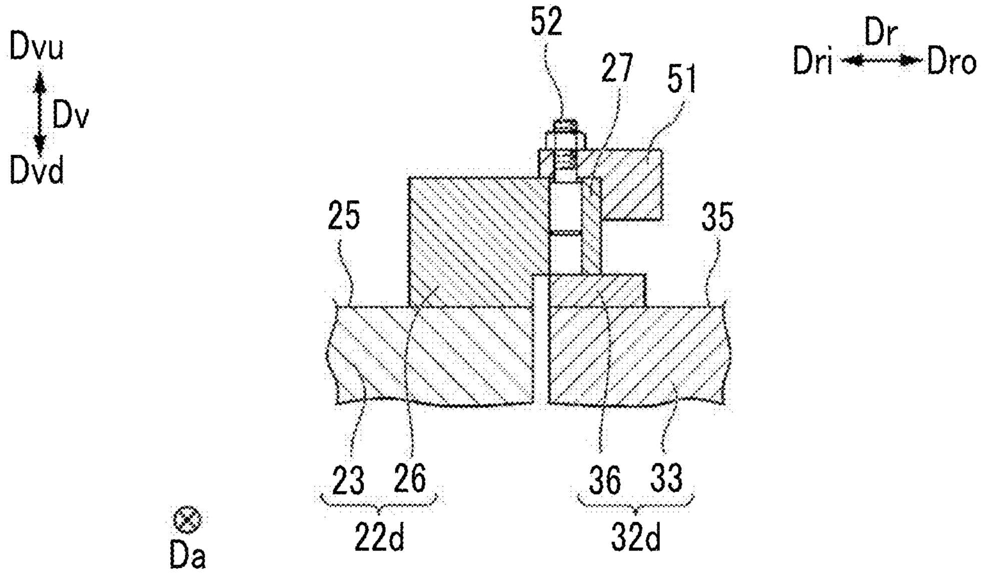
FIG. 8 is a cross-sectional view taken along line VIII-VIII in FIG. 6.

First, a deformation adjustment device 50 is prepared (a preparation step S1). As shown in FIGS. 6 to 8, the deformation adjustment device 50 includes an inner casing-side member 51, an outer casing-side member 53, and a distance adjustment mechanism 57.

The inner casing-side member 51 is attachable to the protrusion portion 27 of the inner casing accessory part 26 to be immovable in the radial direction Dr relative to the protrusion portion 27. Specifically, the inner casing-side member 51 in the present embodiment can be fixed to the protrusion portion 27 of the inner casing accessory part 26 by screws 52 (refer to FIG. 8).

The outer casing-side member 53 is attachable to the lower half outer casing 32*d* to be immovable in the radial direction Dr relative to the lower half outer casing 32*d*. The outer casing-side member 53 includes a pin 54 that can be inserted into the bolt hole 34 of the lower half outer casing 32*d*.

The distance adjustment mechanism 57 can adjust a distance between the inner casing-side member 51 attached to the protrusion portion 27 and the outer casing-side member 53 attached to the lower half outer casing 32*d* in the radial direction Dr. The distance adjustment mechanism 57 includes a rod 58 on which a male screw is formed and a nut 59 in which a female screw that can be screwed onto the male screw of the rod 58 is formed. A rod insertion hole 54*h* into which the rod 58 can be inserted is formed in the pin 54. A rod fixation hole 51*h* to which a tip of the rod 58 can be fixed is formed in the inner casing-side member 51.

Next, the deformation adjustment device 50 is disposed around the protrusion portion 27 of the inner casing accessory part 26 (a device alignment step S2). In the device alignment step S2, first, a portion of the pin 54 of the outer casing-side member 53 is inserted into one of the plurality of bolt holes 34 of the lower half outer casing 32*d* that is closest to the protrusion portion 27 such that a portion of the pin 54 protrudes from the bolt hole 34. Next, the rod 58 of the deformation adjustment device 50 is inserted into the rod insertion hole 54*h* of the pin 54 and then the tip of the rod 58 is inserted into the rod fixation hole 51*h* of the inner casing-side member 51 so that the rod 58 is fixed to the inner casing-side member 51. Next, the inner casing-side member 51 of the deformation adjustment device 50 is fixed to the protrusion portion 27 with the screws 52. As a result, a longitudinal direction of the rod 58 is maintained to be parallel with the radial direction Dr. Then, the nut 59 of the deformation adjustment device 50 is screwed onto the male screw of the rod 58. Note that the order in which components constituting the deformation adjustment device 50 are disposed in the device alignment step S2 is not limited to the order described above.

Figure 9:
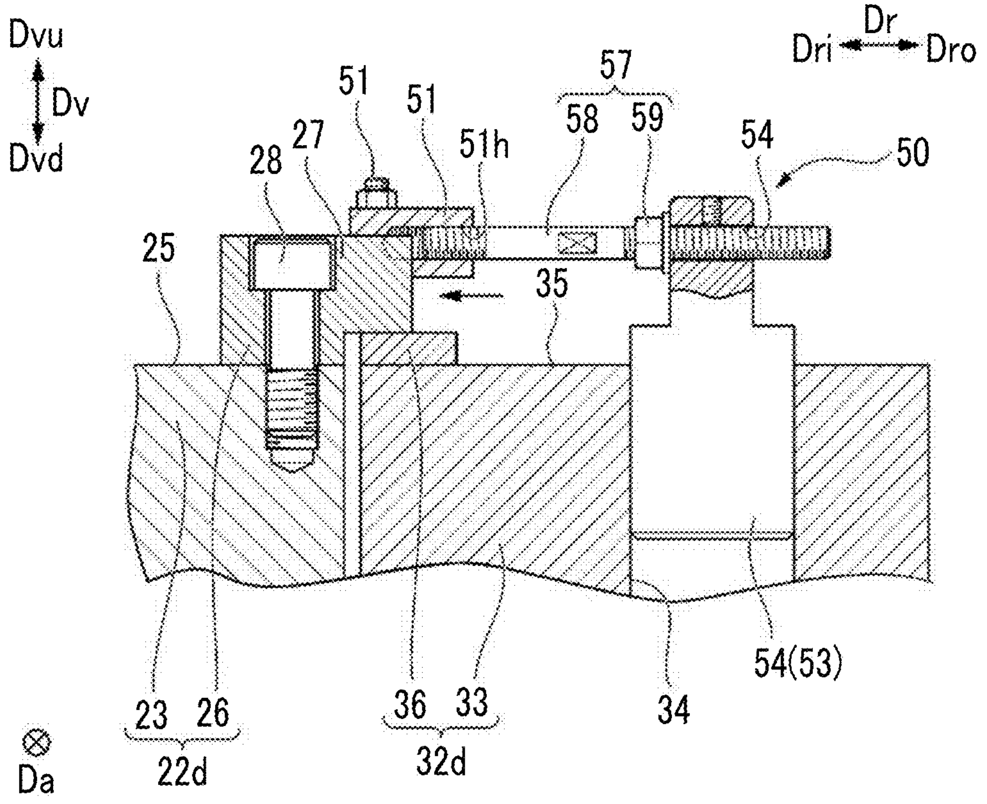
FIG. 9 is a cross-sectional view showing a way in which the deformation adjustment device is disposed when deformation causes an increase in dimension of the lower half inner casing in a vertical direction in the first embodiment of the present disclosure.

In a case where deformation of the lower half inner casing 22*d* causes an increase in dimension in the vertical direction Dv of the lower half inner casing 22*d* (represented by the imaginary lines in FIG. 3) after the deformation and a decrease in dimension in the lateral direction of the lower half inner casing 22*d* as shown in FIG. 3, the nut 59 is screwed onto the male screw of the rod 58 such that the nut 59 is positioned on the radial outer side Dro with respect to the pin 54 as shown in FIGS. 6 and 7. In addition, in a case where deformation of the lower half inner casing 22*d* causes an increase in dimension in the lateral direction of the lower half inner casing 22*d* (represented by the imaginary lines in FIG. 3) after the deformation and a decrease in dimension in the vertical direction Dv of the lower half inner casing 22*d* as shown in FIG. 4, the nut 59 is screwed onto the male screw of the rod 58 such that the nut 59 is positioned on the radial inner side Dri with respect to the pin 54 as shown in FIG. 9. In this case, it is necessary to screw the nut 59 onto the male screw of the rod 58 before the rod 58 is inserted into the rod insertion hole 54*h* of the pin 54.

Then, the nut 59 of the deformation adjustment device 50 is operated such that a distance between the inner casing-side member 51 and the outer casing-side member 53 in the radial direction Dr is changed (a deformation adjustment step S3). In a case where the nut 59 is screwed onto the male screw of the rod 58 such that the nut 59 is positioned on the radial outer side Dro with respect to the pin 54 as shown in FIGS. 6 and 7 in the device alignment step S2, the nut 59 is rotated with respect to the rod 58 such that the distance between the inner casing-side member 51 and the outer casing-side member 53 in the radial direction Dr is decreased. As a result, the inner casing-side member 51 is pulled to the radial outer side Dro. When the nut 59 is operated as described above, even in a case where deformation of the lower half inner casing 22*d* causes an increase in dimension in the vertical direction Dv of the lower half inner casing 22*d* and a decrease in dimension in the lateral direction of the lower half inner casing 22*d* as shown in FIG. 3, the dimension in the vertical direction Dv of the lower half inner casing 22*d* is decreased and the dimension in the lateral direction of the lower half inner casing 22*d* is increased so that the amount of deformation of the lower half inner casing 22*d* is decreased. In addition, in a case where the nut 59 is screwed onto the male screw of the rod 58 such that the nut 59 is positioned on the radial inner side Dri with respect to the pin 54 as shown in FIG. 9 in the device alignment step S2, the nut 59 is rotated with respect to the rod 58 such that the distance between the inner casing-side member 51 and the outer casing-side member 53 in the radial direction Dr is increased. As a result, the inner casing-side member 51 is pulled to the radial inner side Dri. When the nut 59 is operated as described above, even in a case where deformation of the lower half inner casing 22*d* causes an increase in dimension in the lateral direction of the lower half inner casing 22*d* and a decrease in dimension in the vertical direction Dv of the lower half inner casing 22*d* as shown in FIG. 4, the dimension in the lateral direction of the lower half inner casing 22*d* is decreased and the dimension in the vertical direction Dv of the lower half inner casing 22*d* is increased so that the amount of deformation of the lower half inner casing 22*d* is decreased.

In this manner, all steps in the deformation adjustment method for the lower half inner casing 22*d* are finished.

Since deformation of the lower half inner casing 22*d* can be adjusted in the present embodiment as described above, a problem such as contact between the lower half inner casing 22*d* and the rotor 10 that occurs at the time of disassembly or assembly of the rotary machine can be avoided. Furthermore, in the present embodiment, since the deformation adjustment device 50 is not present on the lower contact surfaces 25 of the lower half inner casing 22*d* when deformation of the lower half inner casing 22*d* is adjusted with the deformation adjustment device 50, the upper half inner casing 22*u* can be easily connected to the lower half inner casing 22*d* during deformation adjustment.

In addition, in the present embodiment, it is possible to decrease a distance between the inner casing-side member 51 and the outer casing-side member 53 or to increase the distance between the inner casing-side member 51 and the outer casing-side member 53 by rotating the nut 59, on which the female screw is formed, relative to the rod 58. Therefore, in the present embodiment, it is possible to easily perform fine adjustment of deformation of the lower half inner casing 22*d*.

The distance adjustment mechanism 57 of the present embodiment includes the rod 58 and the nut 59. However, the nut 59 may be omitted. In this case, the pin 54 is used as a nut. Specifically, a female screw that can be screwed onto the male screw of the rod 58 is formed on the pin 54. Furthermore, the rod 58 is attached to the protrusion portion 27 to be immovable in the radial direction Dr and the axial direction Da and rotatable. In addition, in the deformation adjustment step S3, the rod 58 is rotated relative to the pin 54 so that the distance between the inner casing-side member 51 and the outer casing-side member 53 is changed.

Second Embodiment of Deformation Adjustment Method for Lower Half Inner Casing A second embodiment of the deformation adjustment method for the lower half inner casing will be described with reference to FIGS. 10 to 14.

In the deformation adjustment method for the lower half inner casing in the present embodiment as well, the preparation step S1, the device alignment step S2, and the deformation adjustment step S3 are executed as with the deformation adjustment method for the lower half inner casing in the first embodiment.

Figure 10:
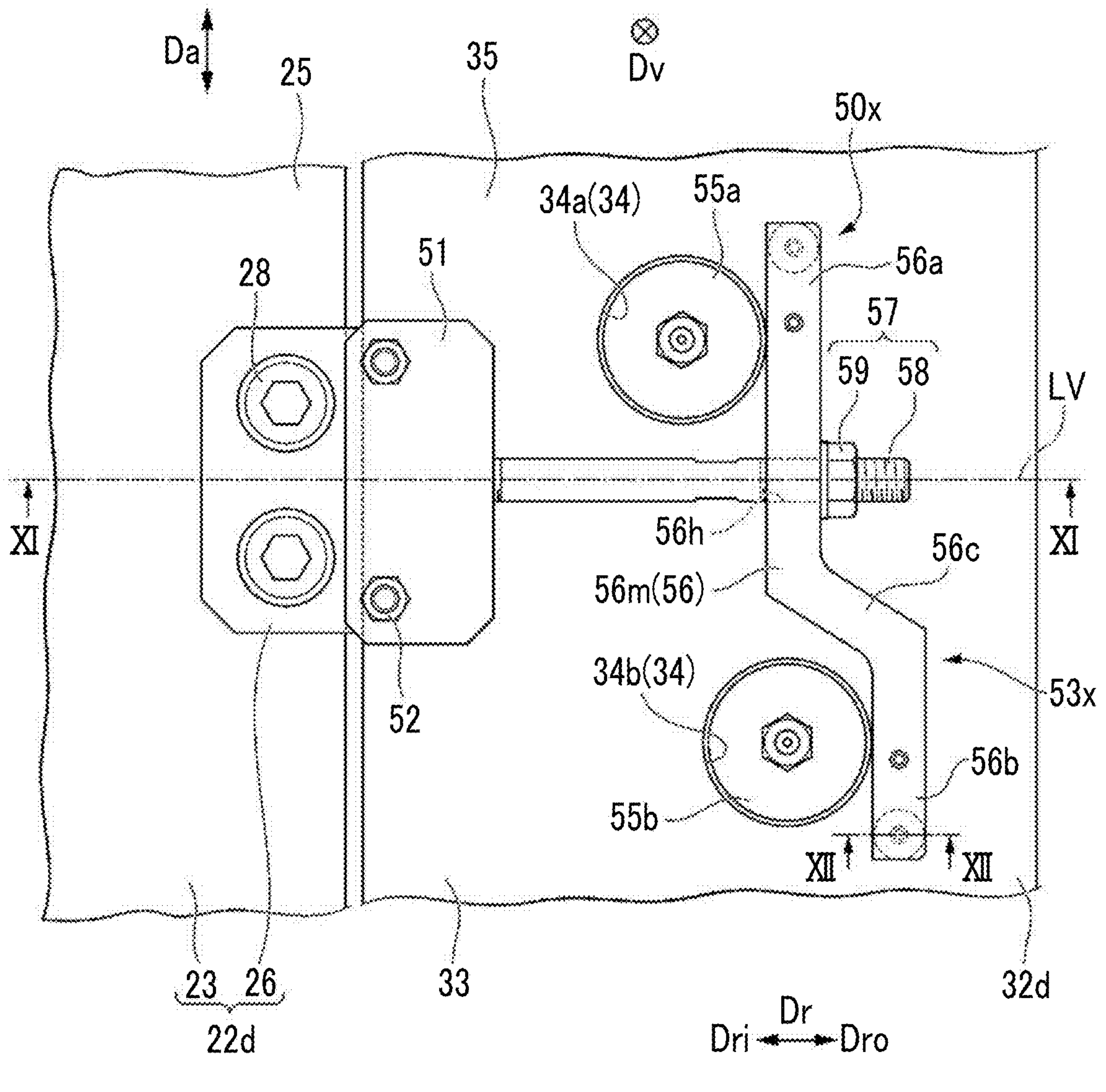
FIG. 10 is a plan view showing a way in which the deformation adjustment device is disposed when deformation causes an increase in dimension of a lower half inner casing in the lateral direction in a second embodiment of the present disclosure.
Figure 11:
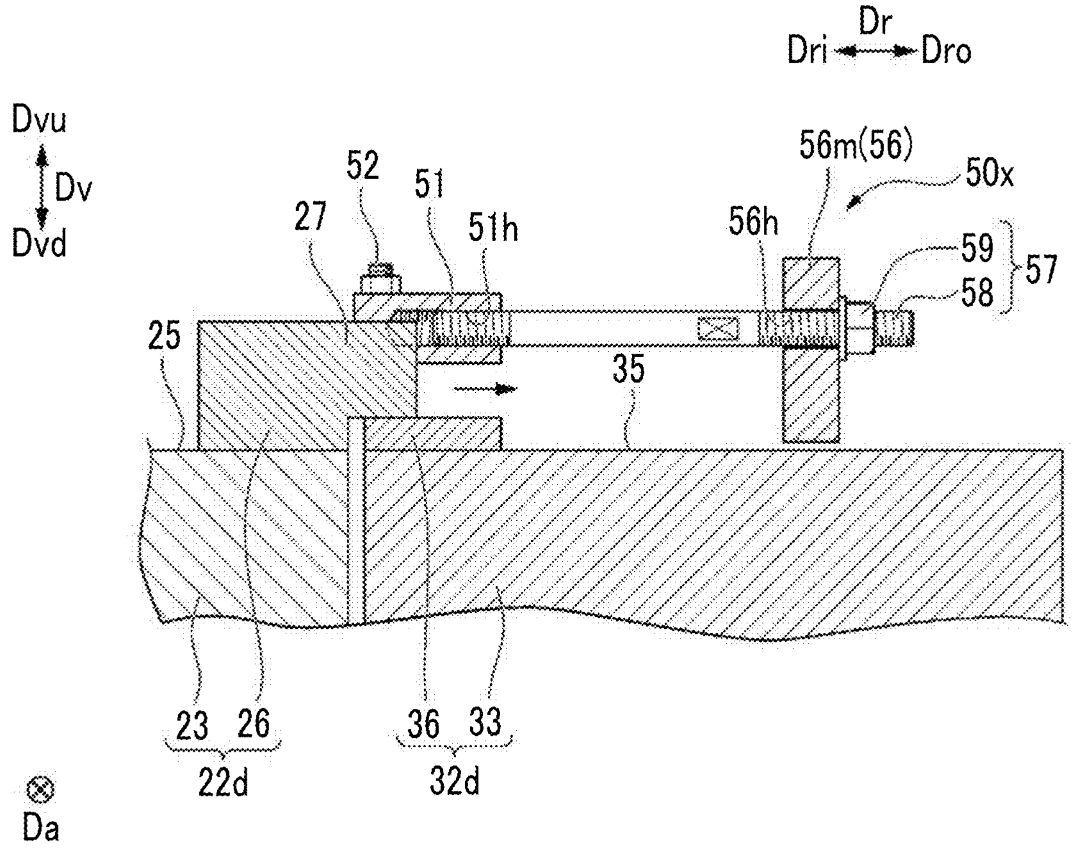
FIG. 11 is a cross-sectional view taken along line XI-XI in FIG. 10.
Figure 12:
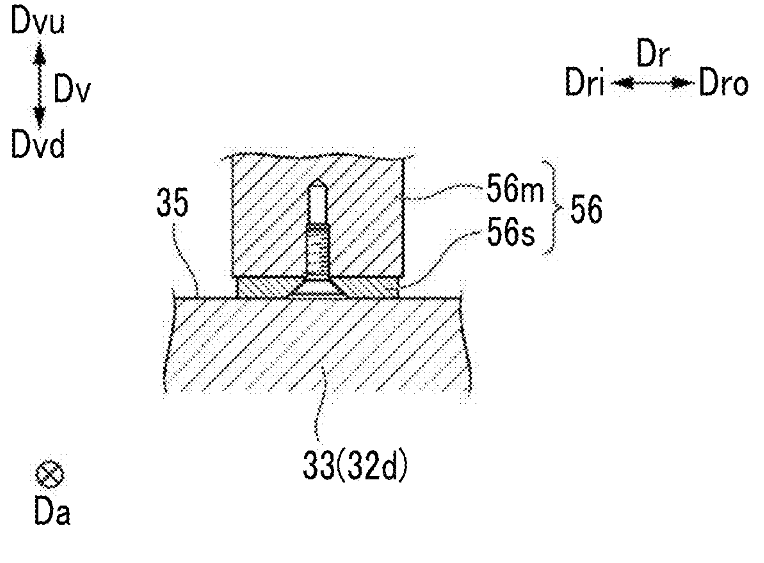
FIG. 12 is a cross-sectional view taken along line XII-XII in FIG. 10.

In the deformation adjustment method for the lower half inner casing 22*d* in the present embodiment, as shown in FIGS. 10 to 12, a deformation adjustment device 50*x* prepared in the preparation step S1 is different from the deformation adjustment device 50 in the first embodiment.

In the first embodiment, as shown in FIG. 6, the bolt hole 34 of the lower half outer casing 32*d* is present on a virtual line LV that passes through a center of the protrusion portion 27 in the axial direction Da and that extends in the radial direction Dr. The deformation adjustment device 50 in the first embodiment is a device suitable for such a case. However, as shown in FIG. 10, there is a case where the bolt hole 34 of the lower half outer casing 32*d* is not present on the virtual line LV that passes through the center of the protrusion portion 27 in the axial direction Da and that extends in the radial direction Dr. The deformation adjustment device 50*x* in the present embodiment is a device suitable for such a case.

As shown in FIGS. 10 to 12, the deformation adjustment device 50*x* in the present embodiment includes the inner casing-side member 51, an outer casing-side member 53*x*, and the distance adjustment mechanism 57 as with the deformation adjustment device 50 in the first embodiment.

The inner casing-side member 51 in the present embodiment is the same as the inner casing-side member 51 in the first embodiment. Therefore, the inner casing-side member 51 in the present embodiment is attachable to the protrusion portion 27 of the inner casing accessory part 26 to be immovable in the radial direction Dr relative to the protrusion portion 27. Specifically, the inner casing-side member 51 in the present embodiment can be fixed to the protrusion portion 27 of the inner casing accessory part 26 by the screws 52.

The distance adjustment mechanism 57 in the present embodiment is the same as the distance adjustment mechanism 57 in the first embodiment. Therefore, the distance adjustment mechanism 57 in the present embodiment can adjust a distance between the inner casing-side member 51 attached to the protrusion portion 27 and the outer casing-side member 53*x* attached to the lower half outer casing 32*d* in the radial direction Dr. The distance adjustment mechanism 57 also includes the rod 58 on which the male screw is formed and the nut 59 in which the female screw that can be screwed onto the male screw of the rod 58 is formed. The rod fixation hole 51*h* to which the tip of the rod 58 can be fixed is formed in the inner casing-side member 51.

The outer casing-side member 53*x* in the present embodiment is different from the outer casing-side member 53 in the first embodiment. The outer casing-side member 53*x* in the present embodiment is attachable to the lower half outer casing 32*d* to be immovable toward the radial inner side Dri or the radial outer side Dro relative to the lower half outer casing 32*d*. The outer casing-side member 53*x* includes a first pin 55*a* that is insertable into a first bolt hole 34*a* which is one of the plurality of bolt holes 34 of the lower half outer casing 32*d*, a second pin 55*b* that is insertable into a second bolt hole 34*b* which is one the plurality of bolt holes 34 of the lower half outer casing 32*d*, and a pin contact member 56 that is able to come into contact with the first pin 55*a* and the second pin 55*b*.

The first bolt hole 34*a* is one of the plurality of bolt holes 34 of the lower half outer casing 32*d* that is disposed on one side in the axial direction Da with respect to the virtual line LV, the virtual line LV passing through the center of the protrusion portion 27 in the axial direction Da and extending in the radial direction Dr. The second bolt hole 34*b* is one of the plurality of bolt holes 34 of the lower half outer casing 32*d* that is disposed on the other side in the axial direction Da with respect to the virtual line LV. The position of the second bolt hole 34*b* in the radial direction Dr is different from the position of the first bolt hole 34*a* in the radial direction Dr.

As shown in FIGS. 10 and 12, the pin contact member 56 includes a body 56*m* that is able to come into contact with the first pin 55*a* and the second pin 55*b* and a shoe 56*s* that is fixed to the body 56*m* by screws. The body 56*m* includes a first contact portion 56*a* that is able to come into contact with the first pin 55*a*, a second contact portion 56*b* that is able to come into contact with the second pin 55*b*, and a connection portion 56*c* that connects the first contact portion 56*a* and the second contact portion 56*b* to each other. The first contact portion 56*a* and the second contact portion 56*b* extend in the same direction. In other words, the first contact portion 56*a* and the second contact portion 56*b* are parallel to each other. As described above, the position of the second bolt hole 34*b* in the radial direction Dr is different from the position of the first bolt hole 34*a* in the radial direction Dr and thus the position of the second pin 55*b* inserted into the second bolt hole 34*b* in the radial direction Dr is different from the position of the first pin 55*a* inserted into the first bolt hole 34*a* in the radial direction Dr. Therefore, the second contact portion 56*b* that is able to come into contact with the second pin 55*b* is offset from the first contact portion 56*a* that is able to come into contact with the first pin in a direction perpendicular to a direction in which the second contact portion 56*b* and the first contact portion 56*a* extend by a distance corresponding to a distance between the second bolt hole 34*b* and the first bolt hole 34*a* in the radial direction Dr. In addition, the thickness of a portion of the first contact portion 56*a* that comes into contact with the first pin 55*a* and the thickness of a portion of the second contact portion 56*b* that comes into contact with the second pin 55*b* are the same as each other in the direction perpendicular to the direction in which the second contact portion 56*b* and the first contact portion 56*a* extend. The shoe 56*s* is attached to a lower portion of the body 56*m* in a state where the body 56*m* is in contact with the first pin 55*a* and the second pin 55*b*. The shoe 56*s* comes into contact with the lower contact surface 35 of the lower half outer casing 32*d* to prevent the lower contact surface 35 from being damaged. Therefore, the shoe 56*s* is formed of a resin or the like. As shown in FIGS. 10 and 11, in the body 56*m*, a rod insertion hole 56*h* into which the rod 58 of the distance adjustment mechanism 57 is insertable is formed to be positioned between the first pin 55*a* and the second pin 55*b* in the axial direction Da when the body 56*m* comes into contact with the first pin 55*a* and the second pin 55*b*.

In the preparation step S1 in the present embodiment, the deformation adjustment device 50*x* as described above is prepared.

In the device alignment step S2 in the present embodiment, first, a portion of the first pin 55*a* of the outer casing-side member 53*x* is inserted into the first bolt hole 34*a* of the lower half outer casing 32*d* such that a portion of the first pin 55*a* protrudes from the first bolt hole 34*a*. Similarly, a portion of the second pin 55*b* of the outer casing-side member 53*x* is inserted into the second bolt hole 34*b* of the lower half outer casing 32*d* such that a portion of the second pin 55*b* protrudes from the second bolt hole 34*b*. Next, the rod 58 of the deformation adjustment device 50*x* is inserted into the rod insertion hole 56*h* of the pin contact member 56 and then the tip of the rod 58 is inserted into the rod fixation hole 51*h* of the inner casing-side member 51 so that the rod 58 is fixed to the inner casing-side member 51. Next, the inner casing-side member 51 of the deformation adjustment device 50*x* is fixed to the protrusion portion 27 with the screws 52. As a result, the longitudinal direction of the rod 58 is maintained to be parallel with the radial direction Dr. Then, the nut 59 of the deformation adjustment device 50*x* is screwed onto the male screw of the rod 58 such that the pin contact member 56 comes into contact with the first pin 55*a* and the second pin 55*b*. That is, the first contact portion 56*a* of the pin contact member 56 is brought into contact with the first pin 55*a* and the second contact portion 56*b* of the pin contact member 56 is brought into contact with the second pin 55*b*. Note that the order in which components constituting the deformation adjustment device 50*x* are disposed in the device alignment step S2 is not limited to the order described above.

Figure 13:
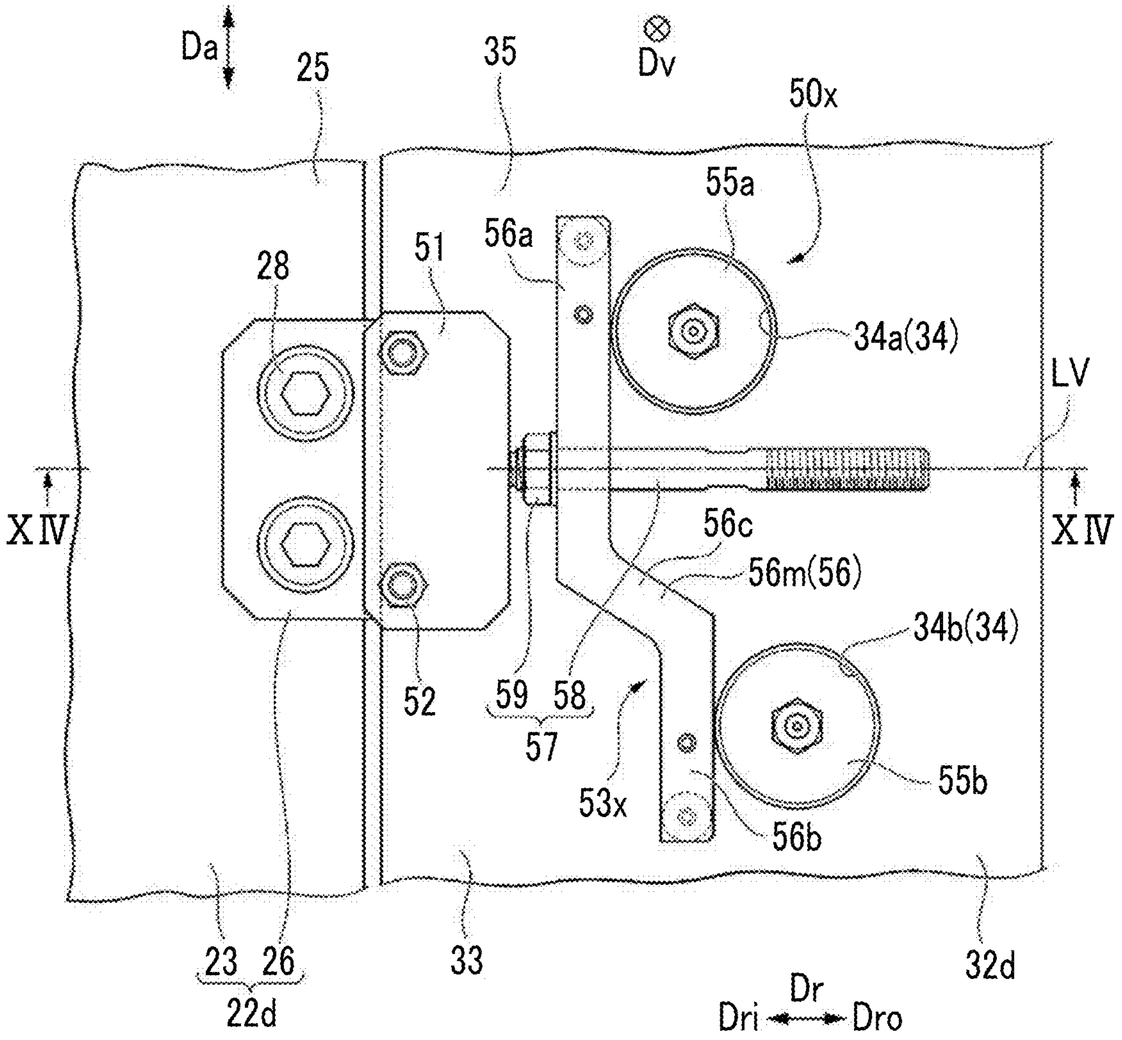
FIG. 13 is a plan view showing a way in which the deformation adjustment device is disposed when deformation causes an increase in dimension of the lower half inner casing in the vertical direction in the second embodiment of the present disclosure.
Figure 14:
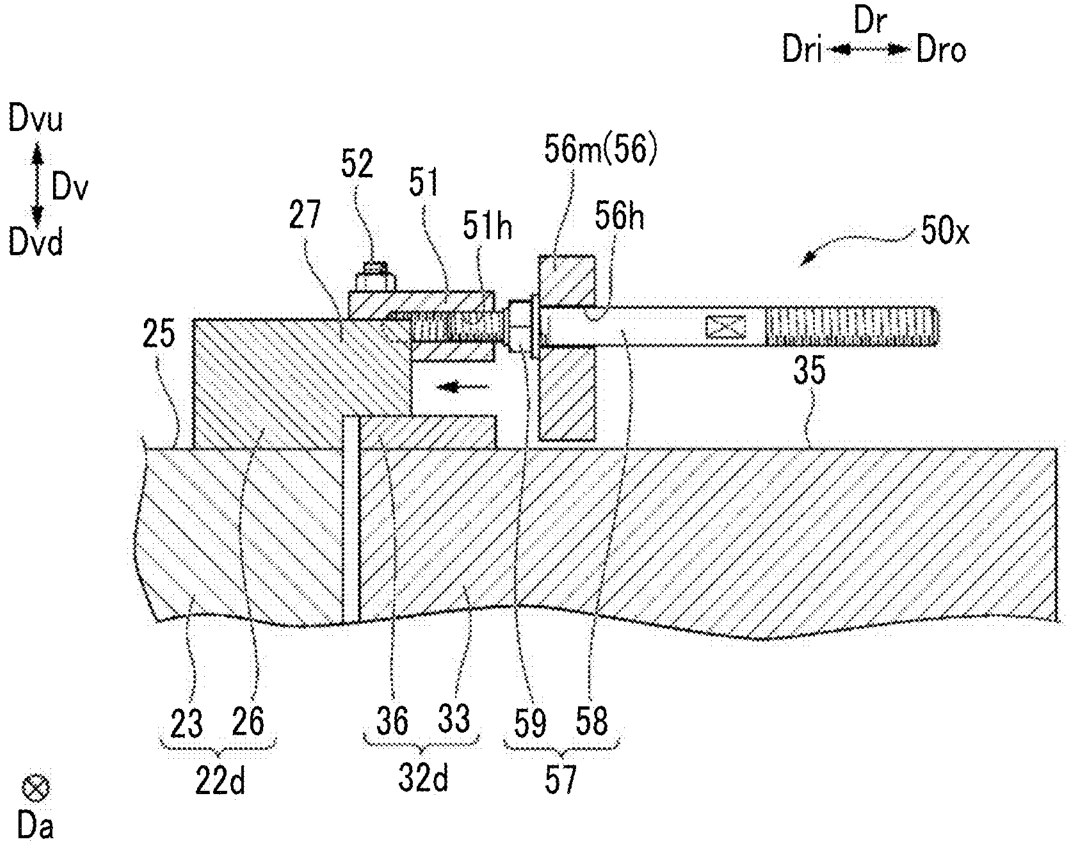
FIG. 14 is a cross-sectional view taken along line XIV-XIV in FIG. 13.

In a case where deformation of the lower half inner casing 22*d* causes an increase in dimension in the vertical direction Dv of the lower half inner casing 22*d* (represented by the imaginary lines in FIG. 3) after the deformation and a decrease in dimension in the lateral direction of the lower half inner casing 22*d* as shown in FIG. 3, the pin contact member 56 is disposed on the radial outer side Dro with respect to the first pin 55*a* and the second pin 55*b* and the pin contact member 56 is brought into contact with surfaces of the first pin 55*a* and the second pin 55*b* that are on the radial outer side Dro as shown in FIGS. 10 and 11. Then, the nut 59 is screwed onto the male screw of the rod 58 such that the nut 59 is positioned on the radial outer side Dro with respect to the pin contact member 56. In addition, in a case where deformation of the lower half inner casing 22*d* causes an increase in dimension in the lateral direction of the lower half inner casing 22*d* (represented by the imaginary lines in FIG. 4) after the deformation and a decrease in dimension in the vertical direction Dv of the lower half inner casing 22*d* as shown in FIG. 4, the pin contact member 56 is disposed on the radial inner side Dri with respect to the first pin 55*a* and the second pin 55*b* and the pin contact member 56 is brought into contact with surfaces of the first pin 55*a* and the second pin 55*b* that are on the radial inner side Dri as shown in FIGS. 13 and 14. Then, the nut 59 is screwed onto the male screw of the rod 58 such that the nut 59 is positioned on the radial inner side Dri with respect to the pin contact member 56. In this case, it is necessary to screw the nut 59 onto the male screw of the rod 58 before the rod 58 is inserted into the rod insertion hole 56*h* of the pin contact member 56.

In the deformation adjustment step S3 in the present embodiment as well, the nut 59 of the deformation adjustment device 50*x* is operated such that a distance between the inner casing-side member 51 and the outer casing-side member 53*x* in the radial direction Dr is changed. In a case where the nut 59 is screwed onto the male screw of the rod 58 such that the nut 59 is positioned on the radial outer side Dro with respect to the pin contact member 56 as shown in FIGS. 10 and 11 in the device alignment step S2, the nut 59 is rotated with respect to the rod 58 such that the distance between the inner casing-side member 51 and the outer casing-side member 53*x* in the radial direction Dr is decreased. As a result, the inner casing-side member 51 is pulled to the radial outer side Dro. When the nut 59 is operated as described above, even in a case where deformation of the lower half inner casing 22*d* causes an increase in dimension in the vertical direction Dv of the lower half inner casing 22*d* and a decrease in dimension in the lateral direction of the lower half inner casing 22*d* as shown in FIG. 3, the dimension in the vertical direction Dv of the lower half inner casing 22*d* is decreased and the dimension in the lateral direction of the lower half inner casing 22*d* is increased so that the amount of deformation of the lower half inner casing 22*d* is decreased. In addition, in a case where the nut 59 is screwed onto the male screw of the rod 58 such that the nut 59 is positioned on the radial inner side Dri with respect to the pin contact member 56 as shown in FIGS. 13 and 14 in the device alignment step S2, the nut 59 is rotated with respect to the rod 58 such that the distance between the inner casing-side member 51 and the outer casing-side member 53*x* in the radial direction Dr is increased. As a result, the inner casing-side member 51 is pulled to the radial inner side Dri. When the nut 59 is operated as described above, even in a case where deformation of the lower half inner casing 22*d* causes an increase in dimension in the lateral direction of the lower half inner casing 22*d* and a decrease in dimension in the vertical direction Dv of the lower half inner casing 22*d* as shown in FIG. 4, the dimension in the lateral direction of the lower half inner casing 22*d* is decreased and the dimension in the vertical direction Dv of the lower half inner casing 22*d* is increased so that the amount of deformation of the lower half inner casing 22*d* is decreased.

In this manner, all steps in the deformation adjustment method for the lower half inner casing 22*d* are finished.

Since deformation of the lower half inner casing 22*d* can be adjusted in the present embodiment as well as described above, a problem such as contact between the lower half inner casing 22*d* and the rotor 10 that occurs at the time of disassembly or assembly of the rotary machine can be avoided. Furthermore, in the present embodiment as well, since the deformation adjustment device 50*x* is not present on the lower contact surfaces 25 of the lower half inner casing 22*d* when deformation of the lower half inner casing 22*d* is adjusted with the deformation adjustment device 50*x*, the upper half inner casing 22*u* can be easily connected to the lower half inner casing 22*d* during deformation adjustment.

In addition, in the present embodiment as well, it is possible to decrease a distance between the inner casing-side member 51 and the outer casing-side member 53*x* or to increase the distance between the inner casing-side member 51 and the outer casing-side member 53*x* by rotating the nut 59, on which the female screw is formed, relative to the rod 58. Therefore, in the present embodiment as well, it is possible to easily perform fine adjustment of deformation of the lower half inner casing 22*d*.

In addition, since the outer casing-side member 53*x* of the present embodiment includes the pin contact member 56 that is able to come into contact with the first pin 55*a* and the second pin 55*b*, in the present embodiment, it is possible to adjust deformation of the lower half inner casing 22*d* as described above even in a case where the bolt hole 34 of the lower half outer casing 32*d* is not present on the virtual line LV and even in a case where the position of the second pin 55*b* inserted into the second bolt hole 34*b* in the radial direction Dr is different from the position of the first pin 55*a* inserted into the first bolt hole 34*a* in the radial direction Dr.

In the present embodiment, the second contact portion 56*b* is offset from the first contact portion 56*a* in the direction perpendicular to the direction in which the second contact portion 56*b* and the first contact portion 56*a* extend. Therefore, a surface of the first contact portion 56*a* that is in contact with the first pin 55*a* and a surface of the second contact portion 56*b* that is in contact with the second pin 55*b* extend in directions perpendicular to a direction in which the rod 58 is moved when the nut 59 is operated. Therefore, in the present embodiment, a direction in which a force received by the pin contact member 56 from the first pin 55*a* acts in a case where the nut 59 is operated, a direction in which a force received by the pin contact member 56 from the second pin 55*b* acts in a case where the nut 59 is operated, and a direction in which a force received by the pin contact member 56 from the nut 59 acts in a case where the nut 59 is operated are all the radial direction Dr. Accordingly, it is easy to operate the nut 59 and it is possible to easily move the rod 58 without difficulty.

The distance adjustment mechanism 57 of the present embodiment includes the rod 58 and the nut 59. However, the nut 59 may be omitted. In this case, the pin contact member 56 is used as a nut. Specifically, a female screw that can be screwed onto the male screw of the rod 58 is formed on the pin contact member 56. Furthermore, the rod 58 is attached to the protrusion portion 27 to be immovable in the radial direction Dr and the axial direction Da and rotatable. In addition, in the deformation adjustment step S3, the rod 58 is rotated relative to the pin contact member 56 so that the distance between the inner casing-side member 51 and the outer casing-side member 53*x* is changed.

In addition, the first pin 55*a* and the second pin 55*b* in the present embodiment may be dedicated components for the deformation adjustment device 50*x* but may be the outer casing fastening bolts 31.

MODIFICATION EXAMPLE

The deformation adjustment devices 50 and 50*x* in the above-described embodiments include the outer casing-side members 53 and 53*x*. However, the deformation adjustment devices 50 and 50*x* may not include the outer casing-side members 53 and 53*x*. In this case, the inner casing-side member 51 attached to the protrusion portion 27 is pressed by a jack or the like or the inner casing-side member 51 is pulled by a chain block or the like so that the deformation adjustment step S3 is executed.

The lower half inner casing body 23 and the inner casing accessory parts 26 of the rotary machine in the above-described embodiments are components different from each other. However, the lower half inner casing body 23 and the inner casing accessory parts 26 may be integrally formed with each other.

The present disclosure is not limited to the embodiments described above. Various additions, changes, replacements, partial deletions, and the like are possible within a scope which does not depart from the conceptual idea and gist of the present invention which are derived from the content defined in the claims and equivalents thereof.

Appendix

The deformation adjustment method for the lower half inner casing 22*d* in the above-described embodiments and the modification example is understood as follows, for example.

(1) A deformation adjustment method for a lower half inner casing in a first aspect is applied to a rotary machine as follows.

The rotary machine includes the rotor 10 rotatable around the axis Ar extending in a horizontal direction, the inner casing 20 covering an outer periphery of the rotor 10, and the outer casing 30 covering an outer periphery of the inner casing 20. The inner casing 20 includes the lower half inner casing 22*d* that has a semi-circular arc shape around the axis Ar and that covers a portion of the rotor 10 that is closer to the lower side Dvd than the axis Ar is and the upper half inner casing 22*u* that has a semi-circular arc shape around the axis Ar and that covers a portion of the rotor 10 that is closer to the upper side Dvu than the axis Ar is. The outer casing 30 includes the lower half outer casing 32*d* that has a semi-circular arc shape around the axis Ar and that covers an outer peripheral side of the lower half inner casing 22*d* and the upper half outer casing 32*u* that has a semi-circular arc shape around the axis Ar and that covers an outer peripheral side of the upper half inner casing 22*u*. The lower half inner casing 22*d* includes the lower half inner casing body 23 that has a semi-circular arc shape around the axis Ar and that covers a portion of the rotor 10 that is closer to the lower side Dvd than the axis Ar is and the inner casing accessory part 26 that is provided at the lower half inner casing body 23. The lower half inner casing body 23 includes the lower contact surfaces 25 that extend in horizontal directions at both ends in the circumferential direction De with respect to the axis Ar and that are able to come into contact with the upper half inner casing 22*u*. The inner casing accessory part 26 includes a protrusion portion 27 that protrudes to be closer to the radial outer side Dro with respect to the axis Ar than the lower half inner casing body 23 is and that protrudes to be closer to the upper side Dvu than the lower contact surfaces 25 are.

A deformation adjustment method for the lower half inner casing 22*d* in the above-described rotary machine includes the preparation step S1 of preparing the deformation adjustment devices 50 and 50*x* including the inner casing-side member 51 that is attachable to the protrusion portion 27 to be immovable in the radial direction Dr with respect to the axis Ar relative to the protrusion portion 27, the device alignment step S2 of attaching the inner casing-side member 51 to the protrusion portion 27 and disposing the deformation adjustment devices 50 and 50*x* including the inner casing-side member 51 around the protrusion portion 27, and the deformation adjustment step S3 of pressing the inner casing-side member 51 attached to the protrusion portion 27 toward the radial inner side Dri with respect to the axis or pulling the inner casing-side member 51 toward the radial outer side Dro.

In the present aspect, since deformation of the lower half inner casing 22*d* can be adjusted, a problem such as contact between the lower half inner casing 22*d* and the rotor 10 that occurs at the time of disassembly or assembly of the rotary machine can be avoided. Furthermore, in the present aspect, since the deformation adjustment devices 50 and 50*x* are not present on the lower contact surfaces 25 and 35 of the lower half inner casing 22*d* when deformation of the lower half inner casing 22*d* is adjusted with the deformation adjustment devices 50 and 50*x*, the upper half inner casing 22*u* can be easily connected to the lower half inner casing 22*d* during deformation adjustment.

(2) A deformation adjustment method for a lower half inner casing in a second aspect is the deformation adjustment method for the lower half inner casing 22*d* in the first aspect in which the deformation adjustment devices 50 and 50*x* prepared in the preparation step S1 include the outer casing-side members 53 and 53*x* that are attachable to an end of the lower half outer casing 32*d* in the circumferential direction De to be immovable toward the radial outer side Dro or the radial inner side Dri relative to the lower half outer casing 32*d*, and the distance adjustment mechanism 57 that is able to adjust a distance between the inner casing-side member 51 attached to the protrusion portion 27 and the outer casing-side members 53 and 53*x* attached to the lower half outer casing 32*d* in the radial direction Dr.

In the device alignment step S2, the outer casing-side members 53 and 53*x* are attached to the lower half outer casing 32*d* and the distance adjustment mechanism 57 is provided. In the deformation adjustment step S3, the distance adjustment mechanism 57 is operated such that the distance between the inner casing-side member 51 and the outer casing-side members 53 and 53*x* in the radial direction Dr is decreased or a distance between the inner casing-side member 51 and the lower half outer casing 32*d* in the radial direction Dr is increased.

In the present aspect, it is possible to decrease the distance between the inner casing-side member 51 and the outer casing-side members 53 and 53*x* or to increase the distance between the inner casing-side member 51 and the lower half outer casing 32*d* by operating the distance adjustment mechanism 57. Therefore, in the present aspect, it is possible to easily perform adjustment of deformation of the lower half inner casing 22*d*.

(3) A deformation adjustment method for a lower half inner casing in a third aspect is the deformation adjustment method for the lower half inner casing 22*d* in the second aspect in which the lower half outer casing 32*d* includes the lower contact surfaces 35 that extend in the horizontal directions at both ends in the circumferential direction De and that are able to come into contact with the upper half outer casing 32*u* and the plurality of bolt holes 34 that are recessed from the lower contact surfaces 35 and through which fastening bolts 31 for connection between the upper half outer casing 32*u* and the lower half outer casing 32*d* pass.

In the device alignment step S2, at least one of the plurality of bolt holes 34 is used to attach the outer casing-side members 53 and 53*x* to the lower half outer casing 32*d* to be immovable toward the radial outer side Dro or the radial inner side Dri relatively.

In the present aspect, it is possible to attach the outer casing-side members 53 and 53*x* to the lower half outer casing 32*d* to be immovable toward the radial outer side Dro or the radial inner side Dri relatively by using the bolt holes 34 of the lower half outer casing 32*d*. Therefore, in the present aspect, a configuration for attaching the outer casing-side members 53 and 53*x* to the lower half outer casing 32*d* to be immovable toward the radial outer side Dro or the radial inner side Dri relative to the lower half outer casing 32*d* can be simplified.

(4) A deformation adjustment method for a lower half inner casing in a fourth aspect is the deformation adjustment method for the lower half inner casing 22*d* in the third aspect in which the outer casing-side member 53 includes the pin 54 that is insertable into one of the plurality of bolt holes 34.

In the device alignment step S2, a portion of the pin 54 is inserted into one of the plurality of bolt holes 34 such that another portion of the pin 54 protrudes from the one of the bolt boles 34.

(5) A deformation adjustment method for a lower half inner casing in a fifth aspect is the deformation adjustment method for the lower half inner casing 22*d* in the third aspect in which the outer casing-side member 53*x* includes the first pin 55*a* and the second pin 55*b* each of which is insertable into any of the plurality of bolt holes 34 and the pin contact member 56 that is able to come into contact with the first pin 55*a* and the second pin 55*b*.

In the device alignment step S2, a portion of the first pin 55*a* is inserted into the first bolt hole 34*a* which is one of the plurality of bolt holes 34 such that another portion of the first pin 55*a* protrudes from the first bolt hole 34*a*, a portion of the second pin 55*b* is inserted into the second bolt hole 34*b* which is one of the plurality of bolt holes 34 such that another portion of the second pin 55*b* protrudes from the second bolt hole 34*b*, and the pin contact member 56 is brought into contact with the first pin 55*a* and the second pin 55*b*.

(6) A deformation adjustment method for a lower half inner casing in a sixth aspect is the deformation adjustment method for the lower half inner casing 22*d* in the fifth aspect in which the first pin 55*a* is the fastening bolt 31 insertable into the first bolt hole 34*a*.

The second pin 55*b* is the fastening bolt 31 insertable into the the second bolt hole 34*b*.

(7) A deformation adjustment method for a lower half inner casing in a seventh aspect is the deformation adjustment method for the lower half inner casing 22*d* in any one of the second to sixth aspects in which the distance adjustment mechanism 57 includes the rod 58 on which a male screw is formed and the nut 59 or the outer casing-side member 53*x* in which a female screw screwable onto the male screw of the rod 58 is formed.

In the device alignment step S2, the rod 58 is inserted into the outer casing-side member 53*x*, a tip of the rod 58 is attached to the inner casing-side member 51, and the male screw of the rod 58 is screwed into the female screw. In the deformation adjustment step S3, the nut 59 or the outer casing-side member 53*x* in which the female screw is formed is rotated relative to the rod 58.

In the present aspect, it is possible to decrease the distance between the inner casing-side member 51 and the outer casing-side members 53 and 53*x* in the radial direction Dr or increase the distance between the inner casing-side member 51 and the lower half outer casing 32*d* in the radial direction Dr by rotating the nut 59 or the outer casing-side member 53*x*, in which the female screw is formed, relative to the rod 58. Therefore, in the present aspect, it is possible to easily perform fine adjustment of deformation of the lower half inner casing 22*d*.

INDUSTRIAL APPLICABILITY

According to the aspects of the present disclosure, it is possible to easily connect an upper half inner casing to a lower half inner casing in a rotary machine even in a state where deformation of the lower half inner casing is being adjusted.

REFERENCE SIGNS LIST

10: Rotor
11: Rotor shaft
12: Rotor blade row
13: Rotor blade
15: Stator vane row
16: Stator vane
20: Inner casing
21: Inner casing fastening bolt
22*u*: Upper half inner casing

22*d*: Lower half inner casing
23: Lower half inner casing body
24: Bolt hole
25: Lower contact surface
26: Inner casing accessory part
27: Protrusion portion
28: Screw
30: Outer casing
31: Outer casing fastening bolt
32*u*: Upper half outer casing
32*d*: Lower half outer casing
33: Lower half outer casing body
34: Bolt hole
34*a*: First bolt hole
34*b*: Second bolt hole
35: Lower contact surface
36: Outer casing accessory part
50, 50*x*: Deformation adjustment device
51: Inner casing-side member
51*h*: Rod fixation hole
52: Screw
53, 53*x*: Outer casing-side member
54: Pin
54*h*: Rod insertion hole
55*a*: First pin
55*b*: Second pin
56: Pin contact member
56*m*: Body
56*a*: First contact portion
56*b*: Second contact portion
56*c*: Connection portion
56*h*: Rod insertion hole
56*s*: Shoe
57: Distance adjustment mechanism
58: Rod
59: Nut
Ar: Axis
Da: Axial direction
Dc: Circumferential direction
Dr: Radial direction
Dri: Radial inner side
Dro: Radial outer side
Dv: Vertical direction
Dvu: Upper side
Dvd: Lower side
LV: Virtual line

The invention claimed is:

1. A deformation adjustment method for a lower half inner casing in a rotary machine that includes a rotor rotatable around an axis extending in a horizontal direction, an inner casing covering an outer periphery of the rotor, and an outer casing covering an outer periphery of the inner casing and in which the inner casing includes the lower half inner casing that has a semi-circular arc shape around the axis and that covers a portion of the rotor that is closer to a lower side than the axis is and an upper half inner casing that has a semi-circular arc shape around the axis and that covers a portion of the rotor that is closer to an upper side than the axis is, the outer casing includes a lower half outer casing that has a semi-circular arc shape around the axis and that covers an outer peripheral side of the lower half inner casing and an upper half outer casing that has a semi-circular arc shape around the axis and that covers an outer peripheral side of the upper half inner casing, the lower half inner casing includes a lower half inner casing body that has a semi-circular arc shape around the axis and that covers a portion of the rotor that is closer to the lower side than the axis is and an inner casing accessory part that is provided at the lower half inner casing body, the lower half inner casing body includes lower contact surfaces that extend in horizontal directions at both ends in a circumferential direction with respect to the axis and that are able to come into contact with the upper half inner casing, and the inner casing accessory part includes a protrusion portion that protrudes to be closer to a radial outer side with respect to the axis than the lower half inner casing body is and that protrudes to be closer to the upper side than the lower contact surfaces are, the method comprising:

a preparation step of preparing a deformation adjustment device including an inner casing-side member that is attachable to the protrusion portion to be immovable in a radial direction with respect to the axis relative to the protrusion portion;

a device alignment step of attaching the inner casing-side member to the protrusion portion and disposing the deformation adjustment device including the inner casing-side member around the protrusion portion; and a deformation adjustment step of pressing the inner casing-side member attached to the protrusion portion toward a radial inner side with respect to the axis or pulling the inner casing-side member toward the radial outer side.

2. The deformation adjustment method for a lower half inner casing according to claim 1, wherein the deformation adjustment device prepared in the preparation step includes an outer casing-side member that is attachable to an end of the lower half outer casing in the circumferential direction to be immovable toward the radial outer side or the radial inner side relative to the lower half outer casing, and a distance adjustment mechanism that is able to adjust a distance between the inner casing-side member attached to the protrusion portion and the outer casing-side member attached to the lower half outer casing in the radial direction, in the device alignment step, the outer casing-side member is attached to the lower half outer casing and the distance adjustment mechanism is provided, and in the deformation adjustment step, the distance adjustment mechanism is operated such that the distance between the inner casing-side member and the outer casing-side member in the radial direction is decreased or a distance between the inner casing-side member and the lower half outer casing in the radial direction is increased.

3. The deformation adjustment method for a lower half inner casing according to claim 2, wherein the lower half outer casing includes lower contact surfaces that extend in the horizontal directions at both ends in the circumferential direction and that are able to come into contact with the upper half outer casing and a plurality of bolt holes that are recessed from the lower contact surfaces and through which fastening bolts for connection between the upper half outer casing and the lower half outer casing pass, and in the device alignment step, at least one of the plurality of bolt holes is used to attach the outer casing-side member to the lower half outer casing to be immovable toward the radial outer side or the radial inner side relatively.

4. The deformation adjustment method for a lower half inner casing according to claim 3, wherein the outer casing-side member includes a pin that is insertable into one of the plurality of bolt holes, and in the device alignment step, a portion of the pin is inserted into one of the plurality of bolt holes such that another portion of the pin protrudes from the one of the bolt holes.

5. The deformation adjustment method for a lower half inner casing according to claim 3, wherein the outer casing-side member includes a first pin and a second pin each of which is insertable into any of the plurality of bolt holes and a pin contact member that is able to come into contact with the first pin and the second pin, and in the device alignment step, a portion of the first pin is inserted into a first bolt hole which is one of the plurality of bolt holes such that another portion of the first pin protrudes from the first bolt hole, a portion of the second pin is inserted into a second bolt hole which is one of the plurality of bolt holes such that another portion of the second pin protrudes from the second bolt hole, and the pin contact member is brought into contact with the first pin and the second pin.

6. The deformation adjustment method for a lower half inner casing according to claim 5, wherein the first pin is the fastening bolt insertable into the first bolt hole, and the second pin is the fastening bolt insertable into the second bolt hole.

7. The deformation adjustment method for a lower half inner casing according to claim 2, wherein the distance adjustment mechanism includes a rod on which a male screw is formed and a nut or the outer casing-side member in which a female screw screwable onto the male screw of the rod is formed, in the device alignment step, the rod is inserted into the outer casing-side member, a tip of the rod is attached to the inner casing-side member, and the male screw of the rod is screwed into the female screw, and in the deformation adjustment step, the nut or the outer casing-side member in which the female screw is formed is rotated relative to the rod.

* * * * *